United States Patent
Furuya et al.

(10) Patent No.: US 9,225,904 B2
(45) Date of Patent: Dec. 29, 2015

(54) IMAGE CAPTURE METHOD AND IMAGE CAPTURE SYSTEM THEREOF

(71) Applicant: HTC Corporation, Taoyuan County (TW)

(72) Inventors: Jorge Furuya, Bellevue, WA (US);
David Brinda, Bellevue, WA (US);
Sung-Hao Lin, Taoyuan County (TW);
Li-Chun Hsu, Taoyuan County (TW);
Pei-En Huang, Taoyuan County (TW);
Meng-Jue Chiang, Taoyuan County (TW); Hsin-Ti Chueh, Taoyuan County (TW)

(73) Assignee: HTC Corporation, Taoyuan District, Taoyuan (TW)

(*) Notice: Subject to any disclaimer, the term of this patent is extended or adjusted under 35 U.S.C. 154(b) by 131 days.

(21) Appl. No.: 13/754,920

(22) Filed: Jan. 31, 2013

(65) Prior Publication Data
US 2013/0208143 A1    Aug. 15, 2013

Related U.S. Application Data (60) Provisional application No. 61/597,849, filed on Feb. 13, 2012.

(51) Int. Cl.
| H04N 5/232 | (2006.01) |
| H04N 1/21 | (2006.01) |
| H04N 5/77 | (2006.01) |
| H04N 9/804 | (2006.01) |

(Continued)

(52) U.S. Cl.
CPC .......... *H04N 5/23293* (2013.01); *H04N 1/212* (2013.01); *H04N 5/23245* (2013.01); *H04N 5/772* (2013.01); *H04N 5/783* (2013.01); *H04N 9/8042* (2013.01); *H04N 9/8205* (2013.01); *H04N 2101/00* (2013.01)

(58) Field of Classification Search
CPC .......... H04N 5/23293; H04N 5/23245; H04N 1/212; H04N 9/8042; H04N 9/8205; H04N 5/772; H04N 5/783
USPC ............................... 348/220.1, 333.02, 231.9
See application file for complete search history.

(56) References Cited

U.S. PATENT DOCUMENTS

| 7,787,026 B1 | 8/2010 | Flory | |
| 2002/0140826 A1* | 10/2002 | Sato et al. | 348/222.1 |

(Continued)

FOREIGN PATENT DOCUMENTS

| EP | 1309186 A1 | 5/2003 |
| JP | 2003219341 A | 7/2003 |
| WO | 03056813 A1 | 7/2003 |

OTHER PUBLICATIONS

Office action mailed on Mar. 12, 2014 for the European application No. 13000703.2, filing date: Feb. 11, 2013, cover page and p. 1-3.

(Continued)

*Primary Examiner* — Nhan T Tran
(74) *Attorney, Agent, or Firm* — Winston Hsu; Scott Margo (57) ABSTRACT

With the aid of separating data paths for generating preview frames, for generating video frames, and for generating encoded camera frames of an image fetching system in a concurrent and mutually-independent manner, the image fetching system is free from introducing unnecessary shutter lags.

21 Claims, 9 Drawing Sheets

(51) Int. Cl.
*H04N 5/783* (2006.01)
*H04N 9/82* (2006.01)
*H04N 101/00* (2006.01)

(56) References Cited

U.S. PATENT DOCUMENTS

| | | | |
|---|---|---|---|
| 2003/0169278 A1 | 9/2003 | Obrador | |
| 2004/0090548 A1* | 5/2004 | Obrador | 348/333.01 |
| 2004/0202443 A1* | 10/2004 | Obrador et al. | 386/4 |
| 2005/0146623 A1* | 7/2005 | Juen | 348/220.1 |
| 2007/0273773 A1* | 11/2007 | Kuroiwa | 348/223.1 |
| 2008/0266422 A1* | 10/2008 | Mabuchi et al. | 348/231.99 |
| 2010/0231735 A1* | 9/2010 | Burian et al. | 348/220.1 |
| 2010/0295966 A1 | 11/2010 | Furlan | |

OTHER PUBLICATIONS

European patent application No. 13000703.2, European Search Report mailing date:May 21, 2013.
Office action mailed on May 29, 2013 for the European application No. 13000703.2, cover page+p. 1-4.
Office action mailed on Oct. 23, 2014 for the European application No. 13000703.2, filing date Feb. 11, 2013, p. 1-4.
Office action mailed on May 27, 2015 for the European application No. 13000703.2, Cover page+ pp. 1-4.

* cited by examiner

IMAGE CAPTURE METHOD AND IMAGE CAPTURE SYSTEM THEREOF

CROSS REFERENCE TO RELATED APPLICATIONS

This application claims priority of U.S. Provisional Application No. 61/597,849 filed on Feb. 13, 2012.

BACKGROUND OF THE INVENTION

1. Field of the Invention

The present invention discloses an image capturing method and an image capture system thereof, and more particularly, an image capturing method of introducing a zero-shutter lag effect and an image capture system utilizing the image capturing method.

2. Description of the Prior Art

Most conventional mobile electronic devices, such as smart phones or tablet computers, acquire both a video recording operation and a camera shooting operation. However, since the video recording operation and the camera shooting operation are separately installed on different applications of a conventional mobile electronic device, the video recording operation and the camera shooting operation cannot be concurrently activated on the conventional mobile electronic device. Therefore a user of the conventional mobile electronic device would be bothered by switching between the video recording operation and the camera shooting operation if the user desires to record video and take photos at the same time.

For example, if a user is intending to make a video and taking interesting pictures on a wedding ceremony using the conventional mobile electronic device, he or she has to keep on switching the video recording operation and the camera shooting operation repeatedly on the conventional mobile electronic device. And it may introduce significant lags while performing the switching between the video recording operation and the camera shooting operation. Even worse of it, it may also introduce the chance of malfunctioning on the conventional mobile electronic device because of the heavy burden of switching on a processor of the conventional mobile electronic device.

On top of that, the conventional mobile electronic device is capable of providing a preview operation. However, a next camera event issued by the user for triggering a camera shutter cannot be activated unless encoded images have been stored in a memory. That is, the conventional mobile electronic device has to wait the completion of encoding previously-captured images for capturing new images. Therefore, it is obvious that the conventional mobile electronic device is time-consuming in capturing images because of the delay caused by encoding of previously-captured images.

SUMMARY OF THE INVENTION

The claimed invention discloses an image capture system, which comprises an image sensor module, an image signal processor, and a backend processing unit. The image sensor module is configured to capture a plurality of original images in a continuous manner. The image signal processor is configured to generate a plurality of preview frames and a first plurality of camera frames of the plurality of original images in a continuous manner. The backend processing unit comprises a preview module, a video processing unit, a camera buffer, an image encoding unit, and a memory. The preview module is configured to provide the plurality of preview frames for display in a continuous manner. The video processing unit is configured to encode a plurality of video frames from the plurality of preview frames in response to a video recording instruction. The camera buffer is configured to buffer the first plurality of camera frames. The image encoding unit is configured to encode a second plurality of camera frames from the first plurality of camera frames in response to an image capturing instruction. The memory is configured to store the plurality of video frames and the plurality of encoded camera frames. The image capture command is received during execution of the video recording command, and the video processing unit and the image encoding unit respectively generate the plurality of video frames and the second plurality of camera frames concurrently in parallel.

The claimed invention discloses an image capture method for use by a portable electronic device, comprising: launching an image capture application on the portable electronic device; receiving a plurality of original frames from an image sensor module of the portable electronic device; providing the plurality of original frames along a first data path to generate a plurality of first frames in a first resolution; providing the plurality of original frames along a second data path to generate a plurality of second frames in a second resolution concurrently with the generation of the first frames along the first data path; receiving a first image capture command; capturing at least a portion of the first frames and storing in a first format in response to the first image capture command along the first path; receiving a second image capture command during the capture of the first frames, the second image capture command is of different type than the first image capture command; and capturing at least one of the second frames and storing in a second format in response to the second image capture command along the second path; wherein the first data path and the second data path are run in a concurrent and mutually-independent manner.

The claimed invention discloses an image capture method for used in an image capture apparatus, comprising: receiving a video recording command for starting a video recording operation; performing the video recording operation by capturing a plurality of video frames in a first resolution in response to the video recording command; receiving a camera shooting command during the performing of the video recording operation; and performing a camera shooting operation to capturing at least one camera frame in a second resolution in response to the camera shooting command.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
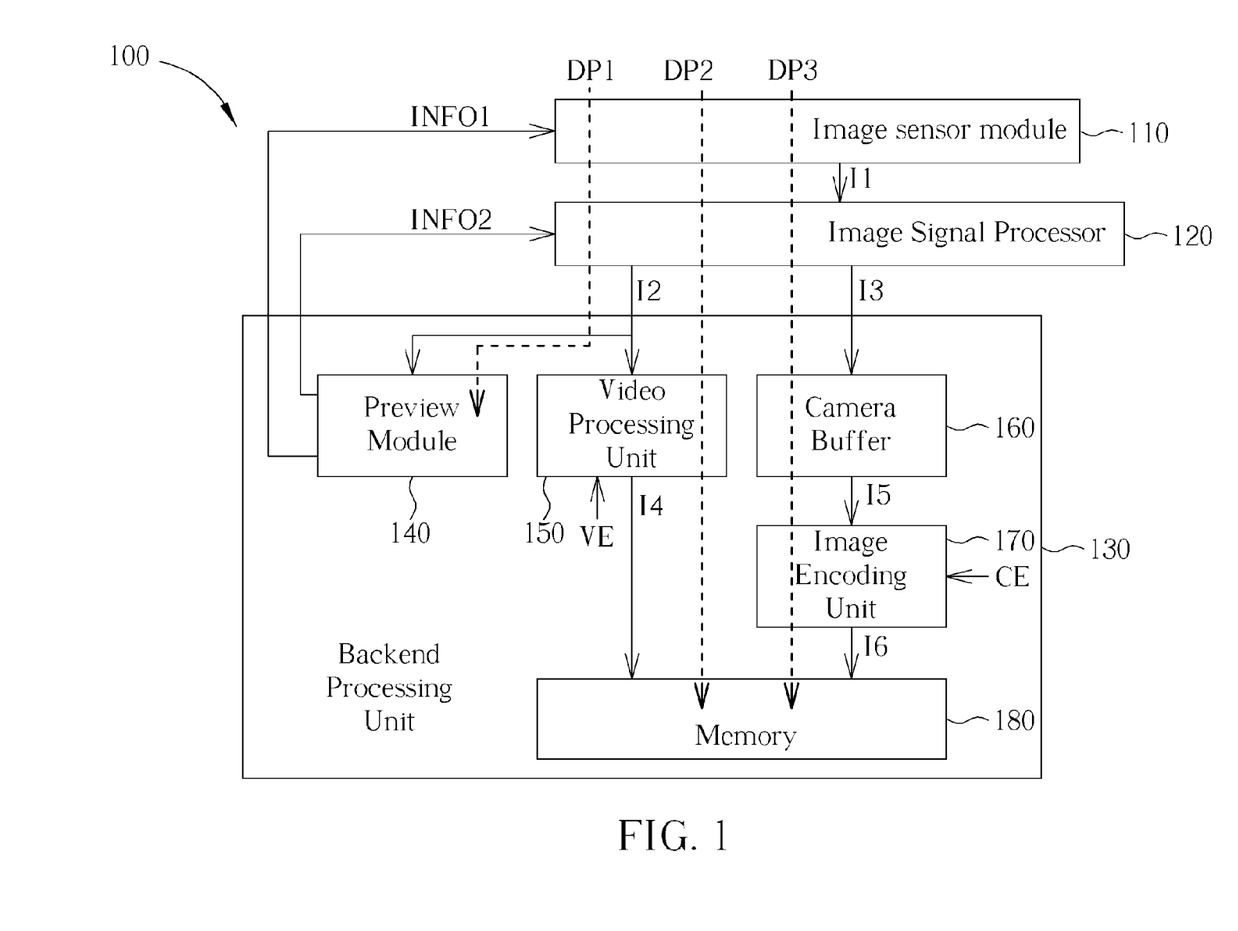
FIG. 1 illustrates an image capture apparatus according to one embodiment of the present invention.

Please refer to FIG. 1, which illustrates an image capture apparatus 100 according to one embodiment of the present invention. As shown in FIG. 1, the image capture apparatus 100 comprises at least an image sensor module 110, an image signal processor 120, and a backend processing unit 130. The backend processing unit 130 comprises a preview module 140, a video processing unit 150, a camera buffer 160, an image encoding unit 170, and a memory 180.

The image sensor module 110 is configured to capture a plurality of original images I1 in a consecutive manner. In one embodiment of the present invention, the resolution of the plurality of original images I1 is a full resolution.

The image signal processor 120 is configured to, among other operations, generate a plurality of preview frames I2 and a plurality of input camera frames I3 from the plurality of original frames I1. In one embodiment of the present invention, the image signal processor 120 generates the plurality of preview frames I2 by scaling the plurality of original images I1 from a first resolution to a second resolution, so that the plurality of preview frames I2 may have smaller sizes and/or lower resolution than the plurality of original images I1 do. The plurality of preview frames I2 can be used to, for example, be provided on a display unit (not shown) or form thumbnails. In one embodiment of the present invention, the image signal processor 120 generates the plurality of input camera frames I3 by scaling the plurality of original images I1 from the first resolution to a third resolution, which may be assigned by a user or may be smaller or equal to the resolution of the plurality of original images I1.

In some embodiment of the present invention, the image signal processor 120 is configured to provide the plurality of preview frames I2 to the preview module 140 and to provide the plurality of input camera frames I3 via separate data paths at constant or different frame rates respectively.

The preview module 140 is configured to provide the plurality of preview frames I2 for viewing by the user. In one embodiment of the present invention, the preview module 140 may be connected to a touch screen (not shown) so that a user may send commands via the touch screen for performing various operations on the images, either the plurality of preview frames I2 or the plurality of input camera frames I3.

The video processing unit 150 is configured to encode the plurality of preview frames I2 to generate a plurality of video frames I4 in response to a video recording command, which may be given by the user via the touch screen and/or other trigger mechanism. In one embodiment of the present invention, a data format of the plurality of video frames I4 is assigned via a user input command from the user. For example, the video processing unit 150 may encode the plurality of video frames I4 in MPEG-4 format.

The camera buffer 160 is configured to constantly buffer the plurality of input camera frames I3. Moreover, in response to an image capture command, such as a camera shooting command, the camera buffer 160 is configured to output one or a plurality of output camera frames I5 from the plurality of input camera frames I3. Any access to the camera buffer 160 may be controlled via a read pointer and write pointer for indicating a location of a new input camera frame I3 to be buffered, or a location of an output camera frame I5 to be outputted. In one embodiment of the present invention, the camera buffer 160 is implemented as a ring buffer, where an overwrite pointer is utilized for indicating a location that can be overwritten. The camera buffer 160 can update its content with new input camera frame I3 and flush or overwrite old input camera frame I1 constantly according to received time order.

The image encoding unit 170 is configured to receive the plurality of output camera frames I5 in response to the camera shooting command and encode the plurality of output camera frames I5 to generate a plurality of encoded camera frames I6. In one embodiment of the present invention, a data format of the plurality of encoded camera frames I6 is assigned by the user or predefined. For example, the image encoding unit 170 may encode the plurality of encoded camera frames I6 in JPEG format.

The memory 180 is configured to store the plurality of video frames I4 received from the video processing unit 150 and/or the plurality of encode camera frames I6 received from the image encoding unit 170. In one embodiment of the present invention, locations in the memory 180 for storing the plurality of video frames I4 and/or the plurality of encode camera frames I6 is assigned by the user or predefined. The memory 180 may be an internal storage unit or an external storage unit. In one embodiment of the invention, the memory 180 can be an eMMC, SD or micro SD card, USB storage device, and/or other suitable storage device.

In embodiments of the present invention, the plurality of encoded camera frames I6 and the plurality of video frames I4 may have different settings, such as resolution, frame rate, operation modes, and etc. In one embodiment of the present invention, an integrated image capture application is launched on the image capture apparatus 100 instantly for a video recording operation and/or a camera shooting operation, in response to a user input command corresponding to the image capture application.

In aspects of data path, a first data path DP1, a second data path DP2, and a third data path DP3 shown in FIG. 1 are provided for processing preview frames, video frames and camera frames respectively. The first data path DP1 for preview frames passes through the image sensor module 110, the image signal processor 120, and the preview module 140. The second data path DP2 for video frames passes through the image sensor module 110, the image signal processor 120, the video processing unit 150, and the memory 180. And the third data path DP3 for camera frames passes through the image sensor module 110, the image signal processor 120, the camera buffer 160, the image encoding unit 170, and the memory 180. Note that in response to a video recording operation is issued, which may be converted to a video event VE transmitted to the backend processing unit 130, the video frames I4 are generated along the second data path DP2. And in response to a camera shooting operation is executed, which is converted to a camera event CE transmitted to the backend processing unit 130, the encoded camera frames I6 are generated along the third data path DP3. Generally speaking, the image sensor module 110 outputs original frames I1 to the image signal processor 120. From the same original frames I1, the image signal processor 120 is capable to produce at least two image frames indifferent resolutions and/or different frame rates concurrently for different operations, for example the preview frames I2 and the input camera frames I3 in this embodiment. That is to say, the image signal processor 120 may provide outputs via separate paths to different processing units at the same time. In the embodiment of FIG. 1, the image signal processor 120 can provide preview frames I2 to the preview module 140 along the first data path DP1 and to the video processing unit 150 along the second data path DP2, and provide the input camera frame I3 to the camera buffer 160 along the third data path DP3 concurrently in parallel. Unlike prior art system, there can only be one path for processing one type of image operations, thus it is not possible to perform two or more image processing operations at the same time. In embodiments of the present invention, the first data path DP1, the second data path DP2, and the third data path DP3 are run by the image capture apparatus 100 in parallel, and it should be noted that the video processing unit 150 and the image encoding unit 170 are capable to process operations in response to the video event VE and the camera event independently and concurrently. Please note that the present invention is not limited to having three data paths, other numbers of data paths may be implemented depending on system needs and requirements and still lies in the scope of the present invention.

Note that the operation of sending the plurality of output camera frames I5 into the image encoding unit 170 and the operation of encoding previously-sent output camera frames I5 to generate the plurality of encoded camera frames I6 may also be performed concurrently in parallel in embodiments of the present invention. For example, under a condition that the image encoding unit 170 has its own buffer for buffering the plurality of output camera frames I5 or the camera buffer 160 is capable of sending the plurality of output camera frames I5 by limiting a current loading of the image encoding unit 170.

Besides, the preview module 140 is capable of continuously providing the plurality of preview frames I2 for display without being interrupted by the second data path DP2 or the third data path DP3 due to the independence between the first data path DP1, the second data path DP2, and third data paths DP3.

With the aid of the mutually-independent and concurrently-running data paths of the image capture apparatus 100, the defects of the conventional mobile electronic device in capturing images can be neutralized. Since the camera shooting operation run on the third data path DP3 or the video recording operation run on the second data path DP2 is not required to wait for the completion of each other nor required to wait for the completion of the first data path DP1. As a result, an integrated image capture application can be launched on the image capture apparatus 100 and be capable of performing video recording and camera shooting at the same time and meanwhile not stopping the preview display of images.

In one embodiment of the present invention, when a video event VE is triggered and still active, or say a video recording operation is executing, the preview module 140 can still keep on providing the plurality of preview frames I2 for display. The preview module 140, which provides the plurality of preview frames I2 to a touch screen, is also capable of providing display of a camera shutter icon for receiving the abovementioned camera shooting command. Therefore, since the preview operation and the image capture operations of the backend processing unit 130 can be executed concurrently, the user of the image capture apparatus 100 is able to press and hold on the camera shutter icon to activate a continuous camera shooting operation of the image capture apparatus 100 without interrupting execution of the preview operation and video shooting operation.

In one embodiment of the present invention, while the preview module 140 keeps on displaying the plurality of preview frames I2, an auto focus operation is performed by the image signal processor 120 to determine a focus of the image sensor module 110 according to the plurality of preview frames I2 and to determine a focus control signal FC indicating a strategy for adjusting the focus of the image sensor module 110, for example, by moving or rotating a camera lens (not shown) of the image sensor module 110. With the aid of the auto focus operation, the focus of the image sensor module 110 is prevented from being adjusted with delay upon receiving a video recording command or an image capturing command since the focus of the image sensor module 110 may have been properly adjusted in advance. Moreover, when a foreground application of a conventional mobile electronic device is switched from the video recording to the camera shooting, an image sensor module of the conventional mobile electronic device is required to change its focus since a focus utilized by the video recording operation is closer than a focus utilized by the image capturing operation. However, with the aid of the auto focus operation utilized in the image capture apparatus 100 of the present invention, the focus of the image sensor module 110, i.e., a field of view of the image sensor module 110, is free from being changed when the current operation is switched from the video recording operation to the camera shooting operation.

Figure 2:
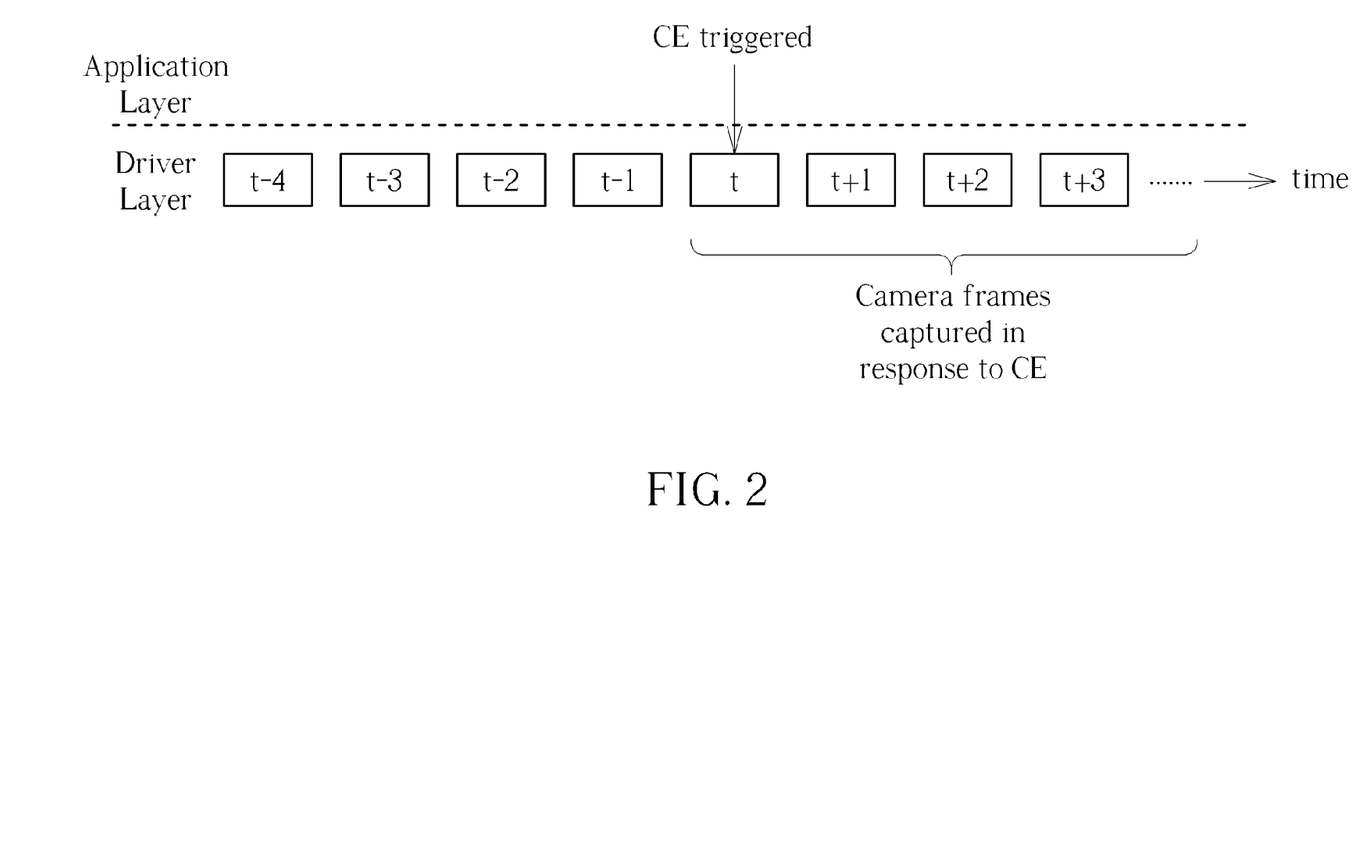
FIG. 2 illustrates a schematic diagram of a frame fetching mechanism performed by the image capture system shown in FIG. 1.

A zero-shutter lag performance can be achieved in the image capture apparatus 100 via a frame fetching mechanism shown in FIG. 2, where the frame fetching mechanism is primarily utilized for the third data path DP3 and/or the second data path DP2. The frame fetching mechanism includes an application layer and a driver layer of the backend processing unit 130. Note that camera frames marked by (t−4), (t−3), (t−2), (t−1), t, (t+1), (t+2), (t+3) indicates camera frames occurring on time moments (t−4), (t−3), (t−2), (t−1), t, (t+1), (t+2), (t+3), where the camera frame (t−4) indicates a moment four time units earlier than the moment t, and the camera frame (t+3) indicates a moment three time units later than the moment t. The time unit may be micro-second in some embodiments of the present invention.

Before introducing the frame fetching mechanism shown in FIG. 2, how camera frames are retrieved in a conventional mobile electronic device will be introduced in advance utilizing the diagram shown in FIG. 2. Conventionally, when a user of the conventional mobile electronic device taps on a camera shutter for capturing camera frames at the moment t, a shutter delay of the conventional mobile electronic device renders the conventional mobile electronic device to substantially start capturing its camera frames after a few time units of the moment t, for example, the moment (t+3). The shutter delay may introduce some unexpected defects in a captured camera frame, such as image distortion.

In the frame fetching mechanism of the present invention, the camera frames marked by (t−4), (t−3), (t−2), (t−1), t, (t+1), (t+2), (t+3) are consecutively buffered at the camera buffer 160. When the camera event CE is triggered and received at the moment t at the application layer, the image processing unit 170 starts retrieving the camera frame marked by the moment t under a single camera shot mode or retrieving a plurality of camera frames marked by the moments t, (t+1), (t+2) and (t+3) under an auto burst mode with a burst length of four camera frames, for example. In one embodiment of the present invention, a continuous burst mode may also be utilized for the frame fetching mechanism to consecutively capture a plurality of camera frames marked by the moments t, (t+1), (t+2), (t+3), (t+4), . . . , as long as the user of the image capture apparatus 100 keeps on triggering the camera event CE, for example, by continuously tapping or tapping and holding on a camera shutter button displayed on the image capture apparatus 100. Note that the burst length may be assigned by user or according to a default setting. With the aid of the frame fetching mechanism of the present invention, the zero shutter lag performance can be introduced since at least one camera frame can be captured in response to the triggered camera event CE without suffering from a shutter lag of a few time units. In embodiments of the present invention, as the storage capability of the camera buffer 160 is getting larger, the zero shutter lag performance of the image capturing system 100 utilizing the third data path DP3 is getting better and more obvious. An available size of the camera buffer 160 may also be assigned by user.

In some embodiments of the present invention, the zero shutter lag performance may also be fulfilled with the aid of the frame fetching mechanism shown in FIG. 2 by replacing the camera frames shown in FIG. 2 with video frames.

In some embodiments of the present invention, the preview module 140 is coupled to a touch screen, which is capable of displaying user interfaces in response to different foreground applications of the image capture apparatus 100 and capable of receiving a touch command triggered corresponding to a currently-activated foreground application of the image capture apparatus 100, where the touch command is regarded as a user input command and may be triggered by a finger tap, a stylus, a pen, and/or other suitable means. The touch screen may receive multiple user input commands at one time in some embodiment of the present invention.

Figure 3:
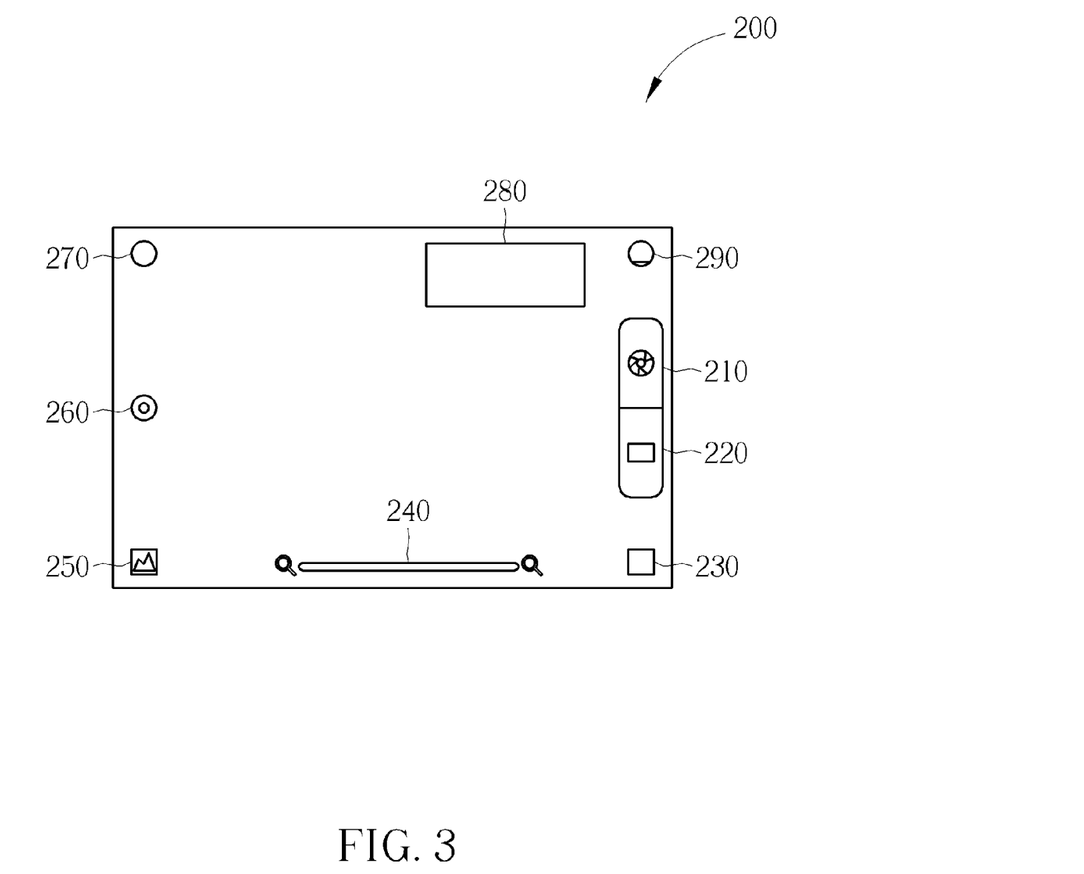
FIG. 3 illustrates a schematic diagram of a user interface shown on the preview module of FIG. 2 according to one embodiment of the present invention.

Please refer to FIG. 3, which illustrates a schematic diagram of a user interface 200 provided by the preview module 140 to display on the touch screen according to one embodiment of the present invention. As shown in FIG. 3, the user interface 200 is configured to display icons including a camera shutter icon 210, a video shutter icon 220, a gallery shortcut icon 230, a zoom bar icon 240, a scene setting icon 250, a setting icon 260, a flash icon 270, a notification area icon 280, and an effect selection icon 290, anyone of which is capable of being trigger via the abovementioned user input command. Please note that less or more icons may be provided on the user interface 200, and the icons may be displayed permanently or be vanished after a period of time until being triggered.

In response to a trigger on the camera shutter icon 210, a camera shooting operation is executed by the image capture apparatus 100 in response to issuance of the camera event CE. In response to a trigger on the video shutter icon 220, a video recording operation is executed by the image capture apparatus 100 in response to issuance of the video event VE. In response to a trigger on the camera shutter icon 210 while the video recording operation is activated and during execution, the camera shooting operation is still activated without interrupting execution of the video recording operation.

One of the plurality of preview frames I2 is displayed on the gallery shortcut icon 230 as a thumbnail, and will be updated according to another incoming preview frame I2. The preview frame I2 displayed in the gallery shortcut icon 230 corresponds to a latest captured camera frame, i.e. the latest encoded camera frame I6. The preview frame I2 displayed in the gallery shortcut icon 230 can also be updated upon completion of a new camera shooting operation. In response to a trigger on the gallery shortcut icon 230, a foreground application of the image capture apparatus 100 is switched to a gallery application for displaying all previously-taken encoded camera frames I6 and the video frames I4 stored in the memory 180. A media playback application for playing back captured or stored video files may also provide an image capture icon, and in response to a trigger on the image capture icon during playback of a stream of the plurality of video frames I4, at least one of the plurality of video frames I4 is selected to be captured and encoded as a encoded camera frame I6.

In response to a trigger on the zoom bar icon 240, at least one of the plurality of original frames I1 is zoomed-in or zoomed-out accordingly, where the trigger may be performed by a leftward slide or a rightward slide on the zoom bar icon 240. Accordingly, the image sensor module 110 may adjust its camera lens to zoom-in or zoom-out to the scene accordingly and automatically adjust its focus.

In response to a trigger on the scene setting icon 250, a currently-displayed scene on the preview module 140 may be switched. In response to a trigger on the setting icon 260, settings of the image capture apparatus 100 may be updated via a user input command. In response to a trigger on the flash icon 270, a flashlight generator equipped on the image capture apparatus 100 may be activate to emit flashlights for enhance image quality under low-luminance circumstances.

All of the abovementioned icons on the user interface 200 may be displayed permanently in some embodiments of the present invention. In some embodiments of the present invention, only a triggered one of the abovementioned icons is displayed on the user interface 200, whereas the other non-triggered icons are shadowed, i.e. disappear, for a predetermined time period right after the displayed icon is triggered, until remaining region on the user interface 200 is tapped via a user input command. For example, if the camera shutter icon 210 is triggered, all the other icons on the user interface 200 will disappear for a few seconds and return in one embodiment of the present invention, or will disappear until the user of the image capture apparatus 100 touches remaining region other than the camera shutter icon 210.

Figure 4:
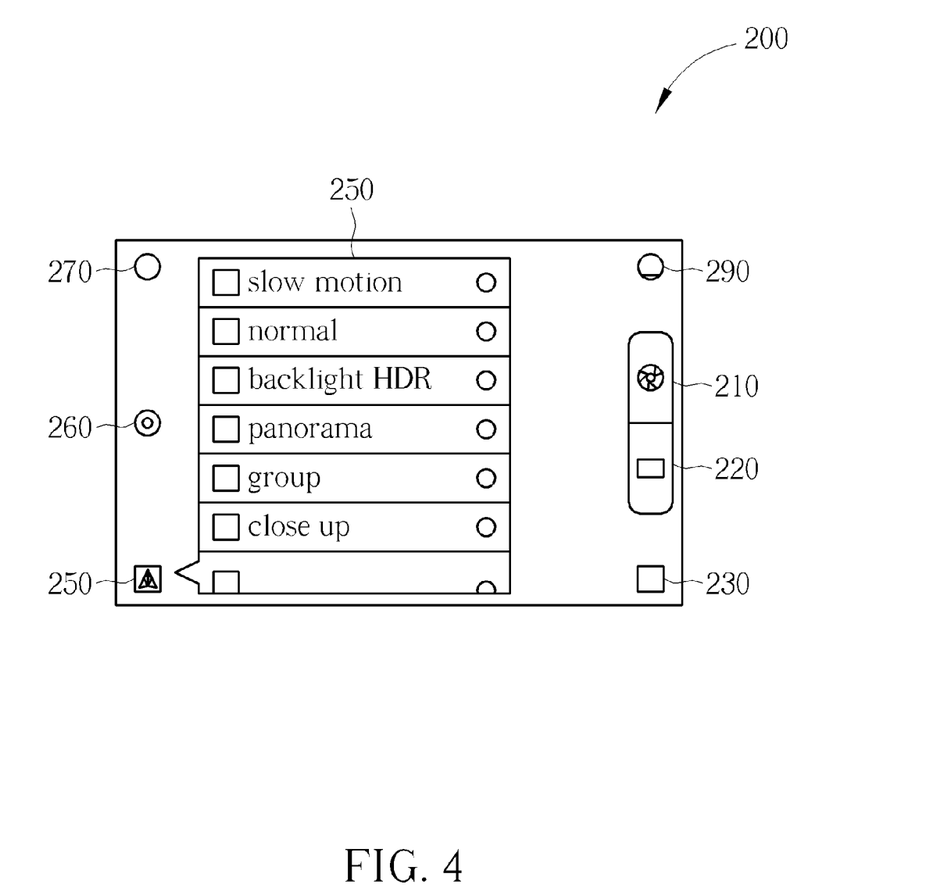
FIG. 4 illustrates an option menu popped out in response to a trigger on the scene setting icon shown in FIG. 3 according to one embodiment of the present invention.
Figure 5:
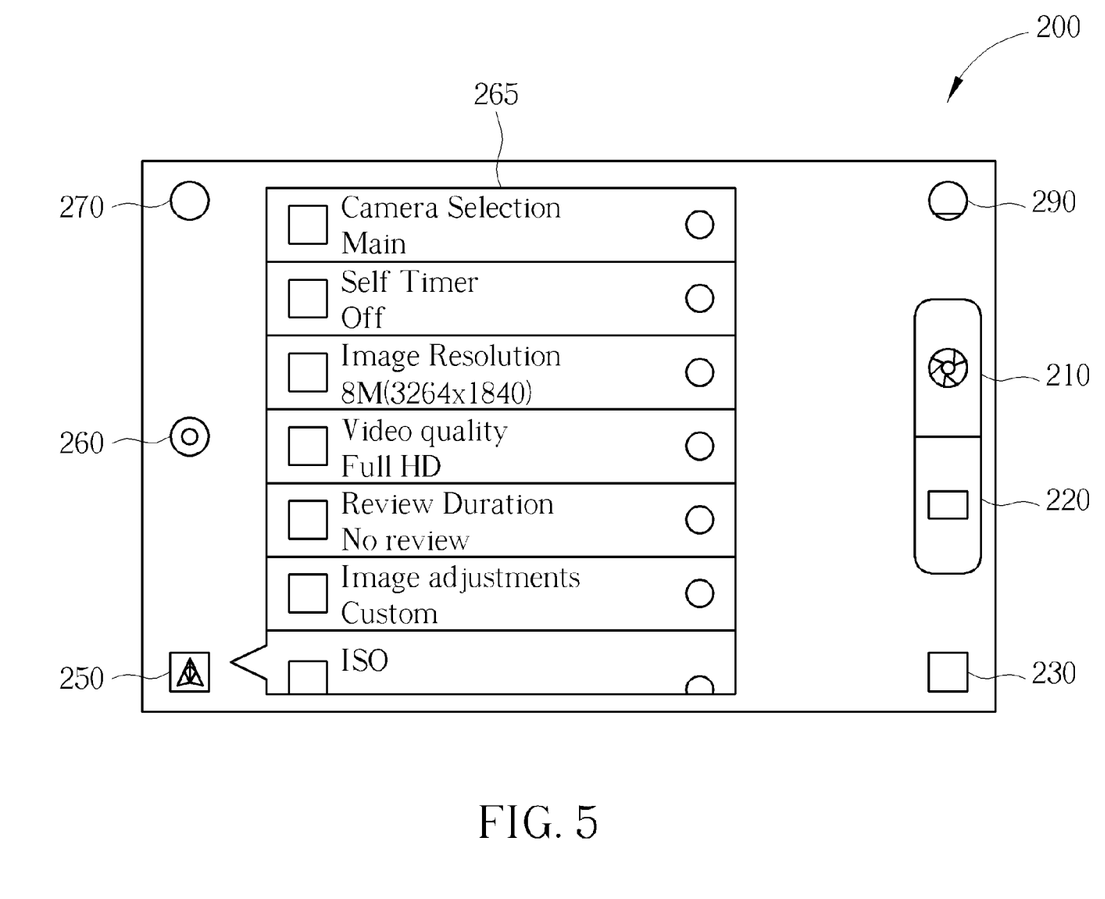
FIG. 5 illustrates an option menu popped out in response to a trigger on the setting icon shown in FIG. 3 according to one embodiment of the present invention.
Figure 6:
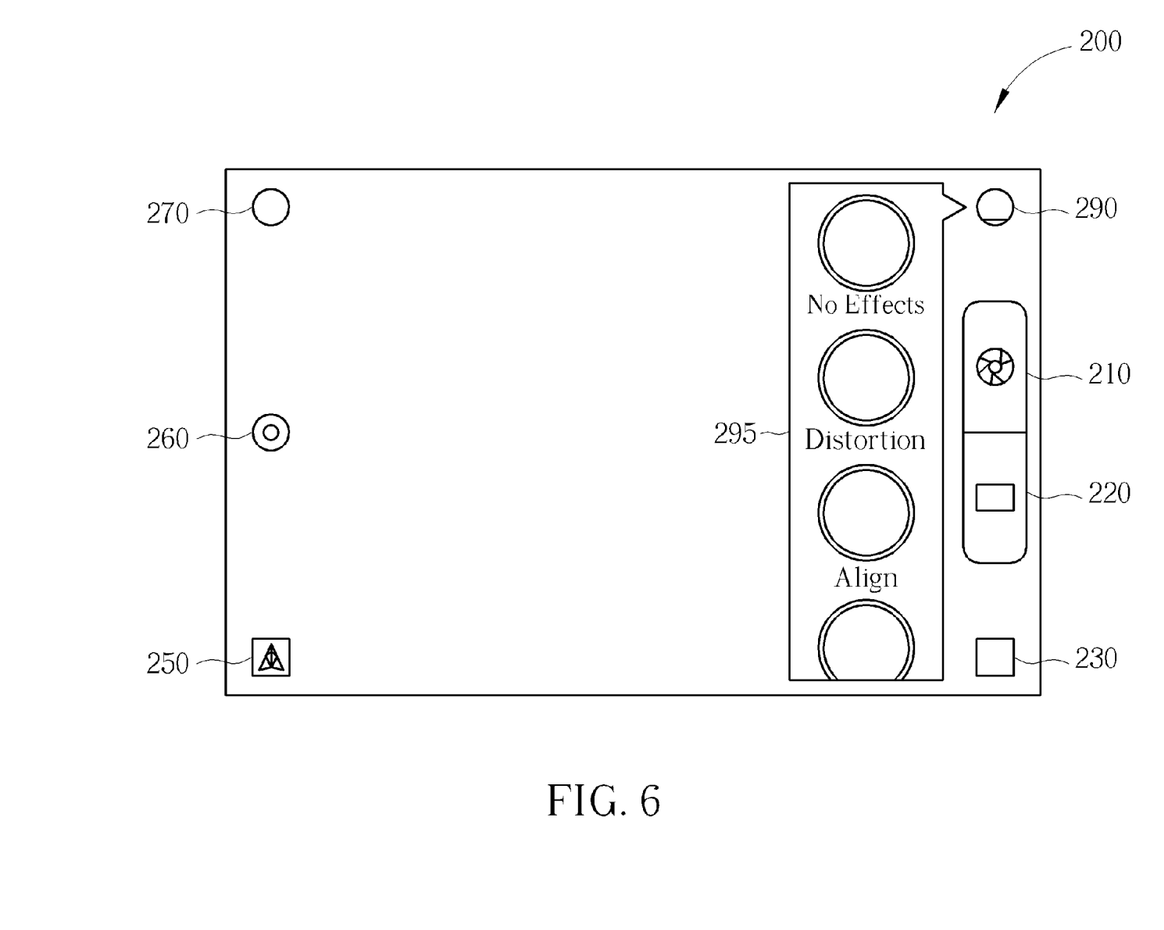
FIG. 6 illustrates an option menu popped out in response to a trigger on the effect selection icon shown in FIG. 3 according to one embodiment of the present invention.

In one embodiment of the present invention, if one of the abovementioned icons on the user interface 200 is triggered via a user input command, the preview module 140 may be configured to provide a corresponding option menu in a pop-out manner for selecting at least one item on the option menu. Options for the video recording operation and the camera shooting operation may be listed on a same layer of the user interface 200 together for enhancing convenience. The user is able to scroll up/down the option menu on the user interface 200 for selecting an item. Please refer to FIG. 4, which illustrates an option menu 255 popped out in response to a trigger on the scene setting icon 250 shown in FIG. 3 according to one embodiment of the present invention. As shown in FIG. 4, the option menu 255 is popped out in response to a trigger of the scene setting icon 250 on the user interface 200. The option menu 255 includes concurrently-shown items 'slow motion', 'normal', 'backlight HDR', 'panorama', 'group', and 'close up', where the item 'slow motion' is provided for the video recording operation, the item 'normal' is provided for both the video recording operation and the camera shooting operation, the items 'backlight HDR' and 'panorama' are provided for the camera shooting operation. Please refer to FIG. 5, which illustrates an option menu 265 popped out in response to a trigger on the setting icon 260 shown in FIG. 3 according to one embodiment of the present invention. As shown in FIG. 5, the option menu 265 includes an item 'Camera Selection' with a status 'Main', an item 'Self Timer' with a status 'Off', an item 'Image Resolution' with a status '8M(3264×1840)', an item 'Video quality' with a status 'Full HD', an item 'Review Duration' with a status 'No review', an item 'Image adjustments' with a status 'Custom', and an item 'ISO'. Status of each item can be changed in response to a trigger of corresponding item. Please refer to FIG. 6, which illustrates an option menu 295 popped out in response to a trigger on the effect selection icon 290 shown in FIG. 3 according to one embodiment of the present invention. As shown in FIG. 6, the option menu 295 includes items 'No Effects', 'Distortion', and 'Align'. Under the conditions shown in FIGS. 4-6, the popped-out menus will disappear as long as the user taps remaining region on the user interface 200 or after a predetermined time period.

In below several embodiments of operation modes that can be executed by the image capture apparatus 100 shown in FIG. 1 will be described. The modes will be introduced as follows:

(1) Video Mode

As mentioned above, the video recording operation may be activated in response to a trigger on the video recording shutter icon 220, where the second data path DP2 is utilized for supporting the video recording operation. In one embodiment of the present invention, the video shutter icon 220 may change its color upon being triggered via a user input command. For example, the video shutter icon 220 may change its color to be opaque while being inactive or turn into red while being enabled or activated. In one embodiment of the present invention, the scene setting icon 250 is triggered via a user input command to open the option menu 255 so that the user is able to choose recording a video in normal speed or in slow motion.

In one embodiment of the present invention, video quality is chosen by the user via the option menu 265 popped out in response to a trigger on the setting icon 260.

Under the slow motion video recording, the video is required to be recorded in a higher frame rate than that under the normal speed, for example, by double. That is, more video frames are required to be captured under the slow motion than under the normal speed within a same time period. For capturing video frames in a higher frame rate, the image sensor module 110 might decrease its resolution in image capturing so that the resolution of the plurality of original images I1 is decreased. And a time marker of the video frames I4 is increased to a longer time period. For example, if a frame rate of the normal speed is 30 frames per second (fps), the frame rate of the slow motion is raised to 60 fps, and the time marker of the video frames I4 is also increased to double time period. As a result, a playback time period of the plurality of video frames I4 is twice as that under the normal speed, i.e., the motion of the scene generated according to the plurality of video frames I4 is slowed down in comparison to the normal speed. The plurality of video frames I4 recorded under the slow motion may also be played under normal speed for restoring the original motion of the scene, where part of the plurality of video frames I4 can be dropped, the drop rate can be relevant or irrelevant to a frame rate ratio between the slow motion and the normal speed. For example, in the case that the frame rate under the slow motion is twice of that under the normal speed, one of two consecutive video frames I4 can be dropped while playbacking the plurality of video frames I4.

(2) Camera Mode

As mentioned above, the camera shooting operation may be activated in response to a trigger on the camera shutter icon 210, where the third data path DP3 is utilized for supporting the camera shorting operation. On top of that, the zero shutter lag performance introduced by the image capture mechanism of the present invention may also benefit the camera shooting operation of the image capture apparatus 100 utilizing the third data path DP3. In one embodiment of the present invention, the user of the image capture apparatus 100 is free from tapping on a preview frame I2 displayed on the touch screen for focusing an object. Instead, an auto focus mechanism is performed by analyzing the preview frame I2 by the preview module 140 automatically to determine focus of the preview frame I2 and to adjust focus of the image sensor module 110 according to the determined focus. However, in another embodiment of the present invention, user may assign an object to be focused via a user input command. For example, user may tap on a face of a person appeared in a scene of the preview frame I1 displayed on the touch screen. Furthermore, in one embodiment of the present invention, an object tracking operation is performed by the image signal processor 130. As a result, the image signal processor 130 is capable of analyzing the preview frame I2 for tracking and locking on objects occurring in the scene, such as face patterns. Thumbnails may be generated using the preview frames I2 and displayed on the user interface 200 in response to the trigger on the gallery shortcut icon 230. In one embodiment of the present invention, while an auto burst mode is activated using the camera shooting operation of the image capture apparatus 100 for capturing a plurality of camera frames continuously or within a timeframe, the thumbnail displayed on the user interface 200 is continuously updated according to a latest captured output camera frame I5. In one embodiment of the present invention, an amount of continuous capturing output camera frames I5 in response to the trigger on the camera shutter icon 220, i.e., occurrence of the camera event CE, is five. In one embodiment of the present invention, in response to the trigger on the camera shutter icon 220, the image capture apparatus 100 also generates a camera shutter sound. Moreover, the image capture apparatus 100 may further smooth the camera shutter sound by adjusting a time interval of producing the camera shutter sound, where the time interval may be determined by the user. For example, the camera shutter sound may be shorter under the auto burst mode.

(3) In-Video Camera Mode

In one embodiment of the present invention, while the video recording operation is activated on the image capture apparatus 100, the user is still able to trigger the camera shutter icon 210 for performing the camera shooting operation without interrupting the execution of the video recording operation with the aid of the independence between the second data path DP2 and the third data path DP3 shown in FIG. 1. That is, the video recording operation and the camera shooting operation are capable of being executed concurrently on the image capture apparatus 100.

While the in-video mode is activated on the image capture apparatus 100, the image signal processor 120 is configured to provide the plurality of preview frames I2 to the video processing unit 150 and provide the plurality of input camera frames I3 to the camera buffer 160 concurrently so that there is concurrence between the video processing unit 150 in generating the plurality of video frames I4 and the image encoding unit 170 in generating the plurality of encoded camera frames I6. On top of that, the plurality of video frames I4 and the plurality of encoded camera frames I6 may also be saved into the memory 180 concurrently.

In one embodiment of the present invention, the camera shooting operation is performed in a full resolution, whereas the video recording operation is performed in a non-HD image quality under the in-video mode because of the independence between the second data path DP2 and the third data path DP3. In one embodiment of the present invention, the auto burst mode of continuously capturing a consecutive plurality of camera frames in response to a continuously-triggered trigger on the camera shutter icon 210 can also be performed without interrupting the execution of the video recording operation under the in-video mode, with the aid of the independence between the camera shooting operation and the video recording operation as well.

(4) Playback Camera Mode

When the video recording operation performs a video playback operation for playing back a recorded video stream having the plurality of video frames I4, the preview module 140 is capable of displaying each of the plurality of video frames I4 so that the user is able to choose one of the plurality of video frames I4 for capturing or browsing. In one embodiment of the present invention, one of the plurality of video frames I4 is automatically captured with a closest time marker of the recorded video stream or by screen shot. As a result, image quality of the video frame I4 captured under the playback camera mode is limited to video quality of the video source, i.e. the plurality of original images I1.

(5) File Access Mode

Figure 7:
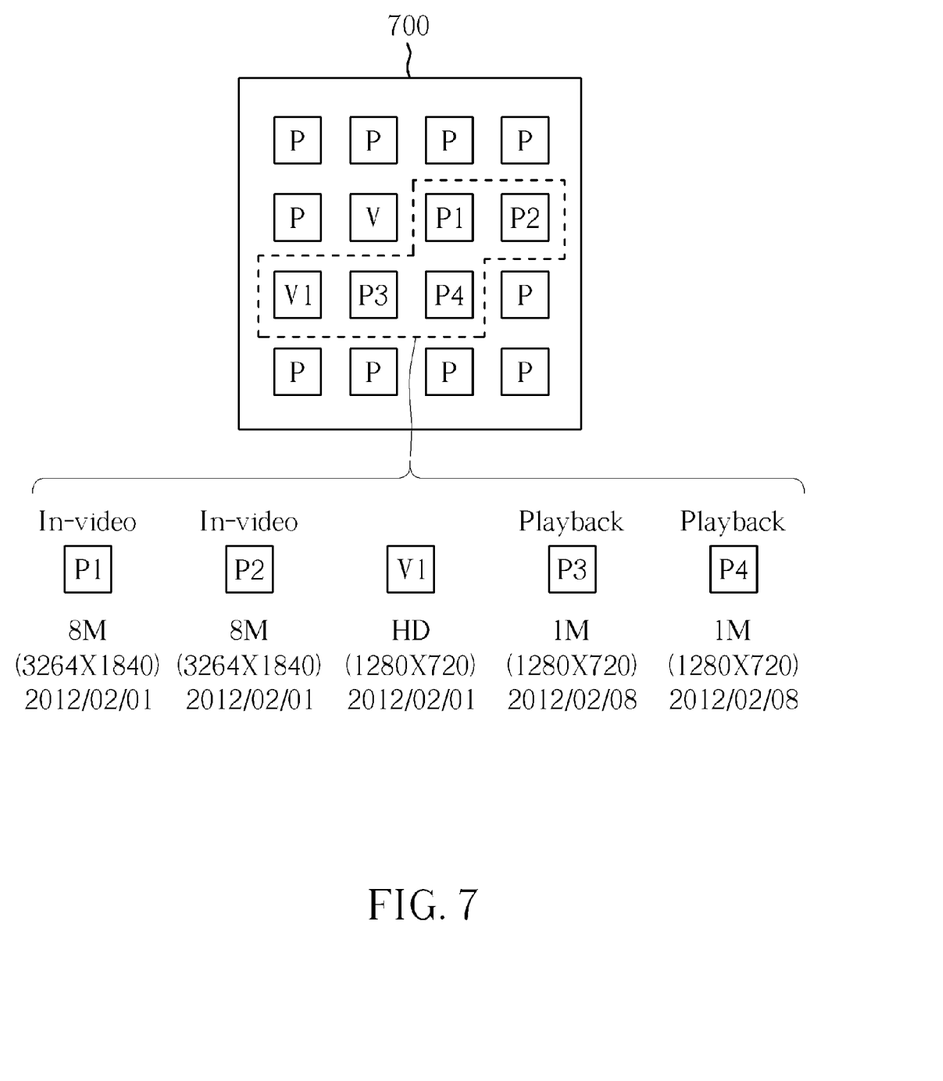
FIG. 7 illustrates the gallery interface shown on the user interface of FIG. 3 according to one embodiment of the present invention.

Under a file access mode of the image capture apparatus 100, a gallery interface 700 is displayed on the top of the user interface 200. Please refer to FIG. 7, which illustrates the gallery interface 700 shown on the user interface 200 according to one embodiment of the present invention. As shown in FIG. 7, there are a plurality of frames displayed on the gallery interface 700, such as a plurality of encoded camera frames P, P1, P2, P3 and P4 and a plurality of video frames V and V1. As can be observed in FIG. 7, a viewing order of the plurality of frames on the gallery interface 700 is determined according to time order of the plurality of frames being captured or is determined following an assigned order, which may be assigned by user. In one embodiment of the present invention, for video frames captured under the in-video mode, the encoded camera frames may be placed ahead of the video frames or next to said video frames so that the user is able to browse camera frames and video frames having correspondence to each other in a sequential manner. For example, as shown in FIG. 7, the video frames V1, which is captured in HD resolution (1280×720) on 2012 Jul. 1, is arranged in the gallery interface 800 next to the encoded camera frames P1 and P2, which are captured as 8 MByte-frames in resolution (3264×1840) during the video recording of the video frames V1.

In one embodiment of the present invention, encoded camera frames captured under the playback mode are automatically placed next to video frames in which the camera frames are captured from. For example, as shown in FIG. 7, the encoded camera frames P3 and P4, which are captured as 1 MByte-frames in resolution (1280×720) on 2012 Feb. 8, are placed next to the video frame V1 captured on a different date during playback of the video frames. As a result, it can be observed that both the video frames V1 and the encoded camera frames P3 and P4 are of same resolution, i.e. (1280× 720).

In one embodiment of the present invention, as the combination (P1, P2, V1, P3, P4) shown in FIG. 7, the encoded camera frames P1 and P2 captured under the in-video camera mode are first placed, the video frame V1 sharing the same capture time with the encoded camera frames P1 and P2 is placed next to the encoded camera frames P1 and P2, and the encoded camera frames P3 and P4 are placed at least. With the aid of the abovementioned order, the user is able to browse all the encoded camera frames and video frames in a sequential manner. In one embodiment of the present invention, while storing encoded camera frames in the memory 180, tags, markers or other types of suitable information are stored together with the encoded camera frames for specifying relevance of the encoded camera frames, where said suitable information may be stored as a metadata or a header. In another embodiment of the invention, the viewing order of these relevant camera frames and video frames may be altered or be arranged by user.

Figure 8:
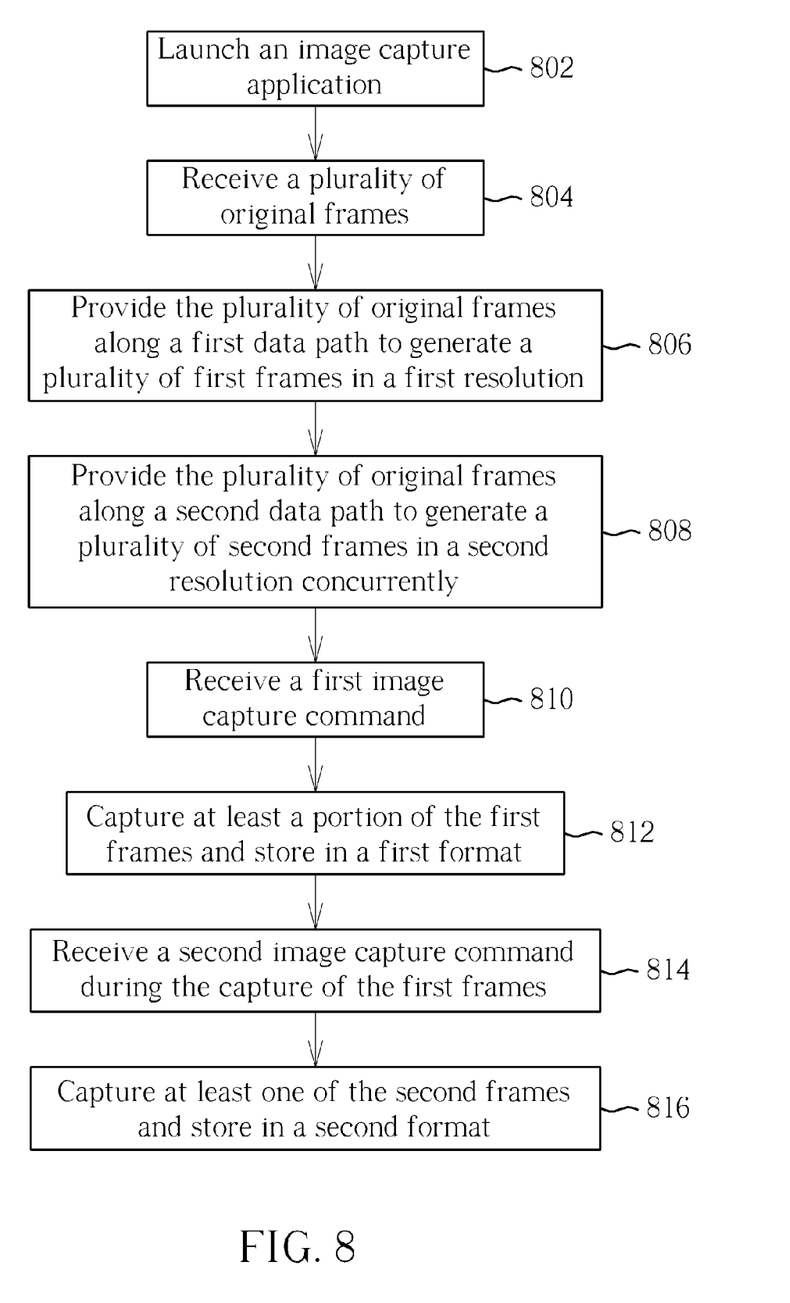
FIG. 8 illustrates a flowchart of an image capture method for use by a portable electronic device according to one embodiment of the present invention.

Please refer to FIG. 8, which illustrate a flowchart of an image capture method for use by a portable electronic device, for example the image capture apparatus 100 shown in FIG. 1, according to one embodiment of the present invention. Note that details of individual image capture operations have been described in the above descriptions, especially related to the camera shooting operation. As shown in FIG. 8, the image capture method includes the following steps:

Step 802: Launch an image capture application on the portable electronic device.

Step 804: Receive a plurality of original frames from an image sensor module of the portable electronic device.

Step 806: Provide the plurality of original frames along a first data path to generate a plurality of first frames in a first resolution.

Step 808: Provide the plurality of original frames along a second data path to generate a plurality of second frames in a second resolution concurrently with the generation of the first frames along the first data path.

Step 810: Receive a first image capture command.

Step 812: Capture at least a portion of the first frames and store in a first format in response to the first image capture command along the first path.

Step 814: Receive a second image capture command during the capture of the first frames.

Step 816: Capture at least one of the second frames and store in a second format in response to the second image capture command along the second path.

In the embodiment of FIG. 8, first an image capture application is launched on the portable electronic device having an image capture apparatus, for example a mobile phone or a tablet, as shown in Step 802. The image capture application is capable to perform both video recording and camera shooting unlike that of convention device, in which video application and camera application are separately installed and launched. Furthermore, the image capture application of the present invention is capable to perform both video recording and camera shooting concurrently in parallel.

In Step 804, a plurality of original frames are received by the image sensor module of the portable device. The plurality of original frames are transmitted to an image signal processor for further processing, which comprises for example RGB conversion, scaling, de-noise, etc. To support parallel operations of video recording and camera shooting, the image signal processor may output image frames of different resolutions and/or frame rates along different data paths at the same time.

As shown in Step 806, a first data path receives the plurality of original images and generates a plurality of first image frames. In one embodiment of the invention, the first image frames are provided as preview frames for displaying to the user. Meanwhile in Step 808, a second data path receives the original frames and generates a plurality of second image frames concurrently. The first image frames and the second image frames may have different settings, such as resolution and frame rate. In one embodiment of the invention, the second data path is used to generate camera frames for camera shooting. The plurality of second image frames may be buffered to a buffer temporarily for later use.

Next in Step 810, a first image capture command is received. The first image capture command may correspond to a first type of image capture, for example video recording. And the image capture command may be received via a user interface, such as a touch screen. Please note that, again to support parallel operations of multiple image capture command, the user interface is also capable to provide control interface of multiple image capture operations. For example, the user interface provides both video shutter icon and camera shutter icon on the same interface and can be triggered independently and concurrently.

In response to the first image capture command, at least a portion of the first image frames are captured and stored in a first format as shown in Step 812. In the embodiment that the first image capture command is a video recording command, the portion of the first image frames starting at the time the first image captured command is received is then processed and encoded into video format, for example MPEG 4. The encoded first image frames are stored in a memory of the portable electronic device, such as eMMC or SD card.

During the execution of the first image capture command (i.e. the portion of the first image frames are still captured and stored), in Step 814 a second image capture command can be received via the same user interface. The second image capture command is a different type of image capture command than the first image capture command. In an embodiment of the present invention, the second image capture command is a camera shooting command and it can be a single shot or burst shot. In another embodiment of the present invention, the first image capture command and the second image capture command may be received via separate user interface, such as a hardware video shutter key and/or a hardware camera shutter key.

In Step 816 the second image frame(s) is captured and stored in a second format in response to the second image capture command. Following above embodiment, the second image frame corresponding to the time the second image captured command is received is extracted from the buffer and encoded in still image format, such as JPEG. As described above, the second image capture command can be a single shot, multiple shot or auto bust shot, and the portion of second image frames are extracted from the buffer. For example if the second image capture command corresponds to a long tap on camera shutter icon (user taps and holds on the camera shutter icon), the buffer would output the portion of second mages frames corresponding to the time period from tap to release for encoding. Please note that the execution of Step 812 is still ongoing concurrently with Step 816 in embodiments of the present invention. Similarly, the encoded second image frames can be stored in the memory.

In summary, the first data path and the second data path of the embodiment of FIG. 8 serve for different types of image capture operations which may generate image frames in different resolutions and formats. The source image frames are inputted to the data paths for generating different types of output image frames concurrently in parallel. The data paths may share some common processing units and may comprise other processing units for specific operations of their own. As shown in FIG. 1, all of the data paths go through the image sensor module 110 and the image signal processor 120, which are common components. And for different operations, such as camera shooting, camera buffer 160 and image encoding unit 170 are used for buffering and encoding camera frames on the third data path.

Figure 9:
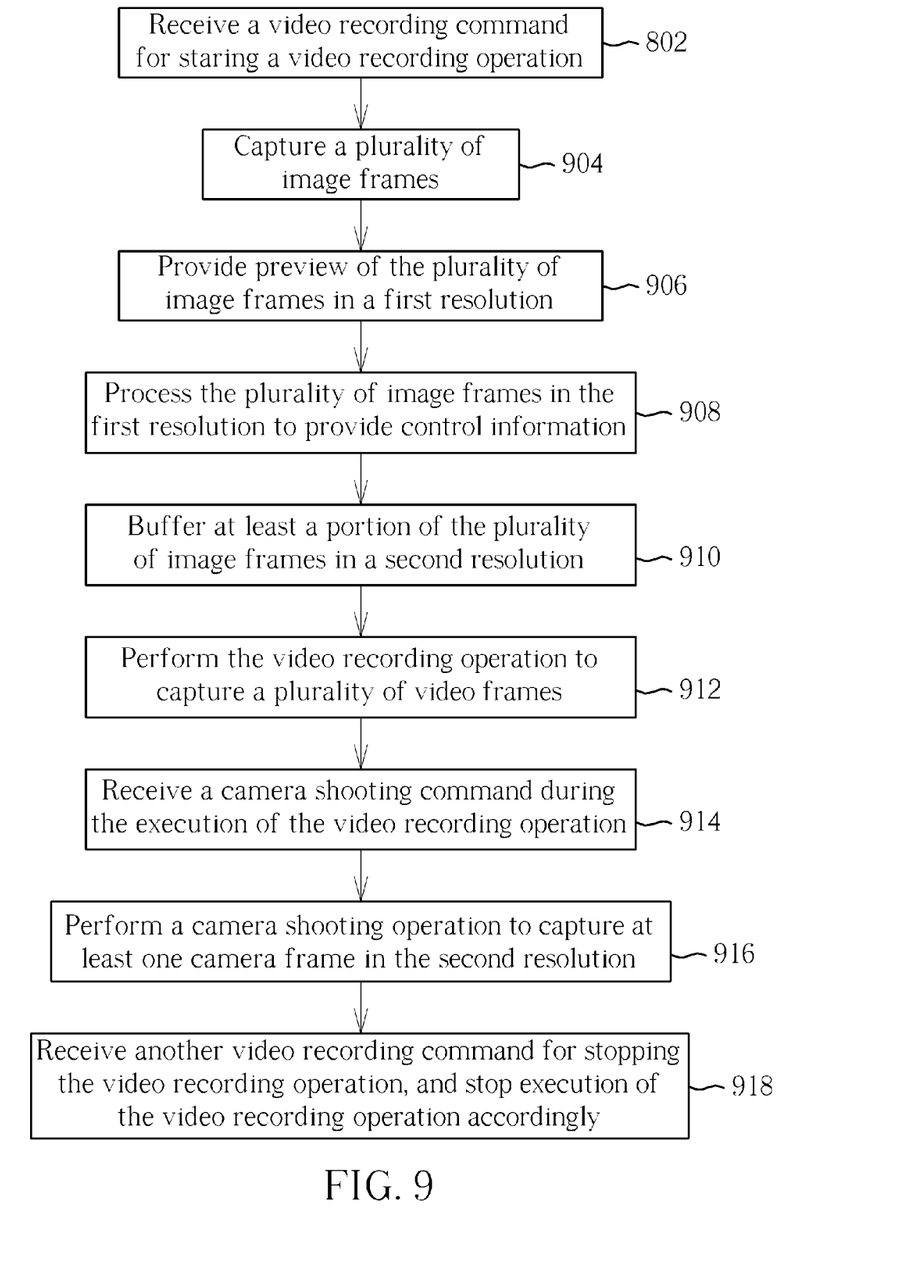
FIG. 9 illustrates a flowchart of an image capture method for use in an image capture apparatus according to one embodiment of the present invention

Next in FIG. 9, another image capture method for use in an image capture apparatus is illustrated. The image capture apparatus is implemented in, for example a mobile phone, tablet, game console, portable media player, digital camera/recorder and/or other portable electronic devices. The image capture method of the embodiment is capable to execute at least two different image capture operations at the same time, for example video recording and camera shooting. The method comprises at least following steps:

Step 902: Receive a video recording command for staring a video recording operation.

Step 904: Capture a plurality of image frames by an image capture apparatus.

Step 906: Provide preview of the plurality of image frames in a first resolution on a display unit of the image capture apparatus.

Step 908: Process the plurality of image frames in the first resolution to provide control information of the image capture apparatus.

Step 910: Buffer at least a portion of the plurality of image frames in a second resolution into a buffer.

Step 912: Perform the video recording operation to capture a plurality of video frames in the first resolution from the plurality of image frames in response to a video recording command.

Step 914: Receive a camera shooting command during the execution of the video recording operation.

Step 916: Perform a camera shooting operation to capture at least one camera frame in the second resolution from the plurality of image frames in response to the camera shooting command.

Step 918: Receive another video recording command for stopping the video recording operation, and stop execution of the video recording operation accordingly.

First in Step 902, a video recording command is received via the user interface of the image capture apparatus. The user interface can be a touch screen, a hardware shutter key, and/or other input/output interface. Then in Step 904, the image capture apparatus captures a plurality of image frames corresponding to a scene. The scene may comprise one or more objects. The captured image frames are provided on a display unit for preview to the user in Step 906. The plurality of image frames can be scaled down to a plurality of preview frames of a first resolution lower than the original resolution to facilitate processing. In Step 908, the scaled preview frames are processed by various operations to provide control information. For example, the operation can be auto focus operation, object detection, and/or others. The preview frames may also be processed in response to user input command. For example, if the user desires to set focus to a specific object and taps on the object via the touch screen of the image capture apparatus, the image capture apparatus may perform object identification corresponding to the tap, and then adjust focus to the identified object. In another embodiment of the invention, the image capture apparatus may perform other operation such as auto exposure, auto white balance, etc. However, to reduce the amount of computation, these processing can be performed on the preview frames of lower resolution. Note that Step 906 is optionally performed. In the embodiment of FIG. 1, Step 906 may comprises auto focus operation, object identification, where information of the result of the auto focus operation may be transmitted to the image sensor module 110 as a focus control signal INFO1, and information of the result of the object identification may be provided to the image signal processor 120 as an object tracking signal INFO2.

In Step 910, the plurality of image frames are buffered into a buffer. In one embodiment of the invention, the plurality of image frames are scaled into a second resolution that is designated by user for camera shooting. The second resolution may be equal or lower than the original resolution, which is the resolution that the image sensor module outputs. The buffer is configured to temporarily store the plurality of image frames for use by camera shooting operation. And the size of the buffer can be predetermined to store a number of image frames over a period of time, or dynamically changed according to its usage.

Upon receiving the video command in Step 902, Step 912 performs the video recording operation to capture a plurality of video frames in the first resolution from the plurality of image frames. The plurality of video frames comprise the portion of image frames staring from the time the video recording command is received and lasting to the time the user stops video recording. The plurality of video frames are encoded in video format, such as MPEG 4. The video format may be predetermined or designated by user. Encoded video frames are stored in the storage unit of the image capture apparatus, such as the memory 180 of FIG. 1. Please note that Steps 906, 908, 910, 912 may be performed concurrently in parallel, in designated order or without specific order. Generally speaking, these steps can be performed separately by different data paths of the portable electronic device. Therefore, they can be executed concurrently in parallel.

During the execution of video recording operation, a camera shooting command can also be received via the user interface in Step 914. That is, video recording and camera shooting can be performed simultaneously without interrupting each other. The camera shooting command can be received from the same user interface, such as touch screen, or via another user interface for camera shooting use, such as a hardware camera shutter key. In Step 916, in response to the camera shooting command, the camera shooting operation is performed to capture at least one camera frame in the second resolution from the plurality of image frames temporarily stored in the buffer. The number of captured camera frames depends on the camera shooting command that the user triggers. In the case that the user triggers a single shot command, a single camera frame corresponding to the time the camera shooting command is triggered would be captured and encoded into image format, such as JPEG. In the case that the user triggers a burst shooting command, a plurality of camera frames would be captured. The burst shooting command can be a combination of a series of single shot commands, or an auto burst command for shooting a predetermined number of image frames. Please note that during the execution of the video recording operation (Step 912), the camera shooting can be received and executed multiple times. And the image capture apparatus also stores the encoded camera frames into its storage unit. The image capture apparatus may allocate different memory space for storing video frames and camera frames respectively, or may store them in combination. The video frames and camera frames captured concurrently may be stored to have similar or the same header or metadata.

Last in Step 918, the user stops video recording by triggering another video recording command. In response to the video recording command, execution of the video recording operation stops. Then the user may view the captured video frames and camera frames in the gallery application, which is used for image review. Since they are stored with association, the user may view associated video frames and camera frames in other form, such as slide show, auto serial playback, and/or others.

Concluded from above description, the present invention provides a method and apparatus for performing at least two types of image capture operations concurrently in parallel. In one embodiment, the image capture apparatus may perform both video recording and camera shooting concurrently. The video frames and camera frames are processed via separate data paths to achieve parallel processing. Each data path can process image frames in different resolution and/or resolution. As a result, an integrated image application can installed and launch on the image capture apparatus for performing multiple types of image capture operation without switching from one to another. Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image capture apparatus, comprising:
an image sensor module, configured to capture a plurality of original images in a continuous manner;
an image signal processor, configured to concurrently generate a plurality of preview frames and a first plurality of camera frames from the plurality of original images; and
a backend processing unit, comprising:
a preview module, configured to receive the plurality of preview frames through a first data path for display;
a video processing unit, configured to encode the plurality of preview frames received through a second data path to generate a plurality of video frames in response to a video recording command;
a camera buffer, configured to buffer the first plurality of camera frames received through a third data path;
an image encoding unit, configured to encode the first plurality of camera frames to generate a second plurality of camera frames in response to an image capturing command; and
a memory, configured to store the plurality of video frames and the second plurality of camera frames;
wherein when the image capture command is received during execution of the video recording command, the video processing unit processes the plurality of preview frames to encode the plurality of video frames at the same time as the image encoding unit processes the first plurality of camera frames to encode the second plurality of camera frames;
wherein the first data path, the second data path, and the third data path are operated by the image capture apparatus in parallel.

2. The image capture apparatus of claim 1, wherein the plurality of preview frames are generated by down-scaling the plurality of original images by the image signal processor, and the plurality of preview frames are provided by the preview module as thumbnails.

3. The image capture apparatus of claim 1, wherein the second plurality of camera frames and the plurality of video frames have different settings comprising resolution and/or frame rate.

4. The image capture apparatus of claim 1, wherein the preview module is further configured to provide a user interface for receiving both the video recording command and the image capturing command.

5. The image capture system of claim 4, wherein the user interface is configured to display a thumbnail icon corresponding to one of second plurality of camera frames.

6. The image capture apparatus of claim 1, wherein the camera buffer is implemented as a ring buffer.

7. The image capture apparatus of claim 1, wherein the image signal processor is further configured to analyze the plurality of preview frames to determine control information of the image sensor module, and the image sensor module is further configured to control its operation according to the control information.

8. The image capture apparatus of claim 1, wherein the control information comprises focus information.

9. The image capture apparatus of claim 1, wherein the video processing unit is further configured to encode the plurality of preview frames by editing a time mark of the plurality of video frames in response to a slow motion instruction.

10. The image capture system of claim 1, wherein the video processing unit and the image encoding unit respectively generate the plurality of video frames and the second plurality of camera frames concurrently in parallel.

11. An image capture method for use by a portable electronic device, comprising:
 launching an image capture application on the portable electronic device;
 receiving a plurality of original frames from an image sensor module of the portable electronic device;
 providing the plurality of original frames concurrently along a first data path, a second data path, and a third path, wherein the first path and the second path are used to generate a plurality of first frames in a first resolution and the third data path is used
 to generate a plurality of second frames in a second resolution;
 providing the plurality of first frames continuously to a display along the first data path;
 receiving a first image capture command;
 capturing at least a portion of the first frames and storing in a first format in response to the first image capture command along the second path;
 receiving a second image capture command during the capture of the first frames, the second image capture command is of different type than the first image capture command; and
 capturing at least one of the second frames and storing in a second format in response to the second image capture command along the third path;
 wherein the first data path, the second data path, and the third path are run in a concurrent and mutually-independent manner, and processing of the first resolution and processing of the second resolution are different and concurrently executed from each other.

12. The method of claim 11, wherein the first image capture command is a video recording command and the second image capture command is a camera shooting command, and the first resolution is equal or lower than the second resolution.

13. The method of claim 11, wherein the capturing of the portion of the first frames further comprises encoding the portion of the first frames in the first format, and the capturing of the at least one second frames further comprises encoding the at least one second frame in the second format.

14. The method of claim 11, wherein the generating of plurality of second frames further comprises buffering the plurality of second frames in a buffer.

15. The method of claim 14, wherein the capturing of the at least one second frames further comprises extracting the at least one second frame corresponding to the second image capture command from the buffer.

16. The method of claim 11, wherein the first data path is formed by at least a preview module, the second data path is formed by at least a video processing unit and the third data path is formed by at least a buffer and an image encoding unit; and wherein the second data path is run at a first frame rate and the third data path is run at a second frame rate different from the first frame rate.

17. An image capture method for used in an image capture apparatus, comprising:
 displaying a plurality of preview frames provided along a first data path on a display;
 receiving a video recording command for starting a video recording operation;
 performing the video recording operation by capturing a plurality of video frames in a first resolution provided along a second data path in response to the video recording command;
 receiving a camera shooting command during the performing of the video recording operation; and
 performing a camera shooting operation to capturing at least one camera frame in a second resolution provided along a third data path in response to the camera shooting command;
 wherein when the camera shooting command is received during performing of the video recording operation, the plurality of video frames are processed at the same time as the processing of the at least one camera frame, and the display of the plurality of preview frames is not interrupted by the video recording operation and the camera shooting operation.

18. The method of claim 17, further comprising:
 capturing a plurality of image frames; and
 providing preview of the plurality of image frames on a display unit of the image capture apparatus;
 wherein the plurality of video frames and the at least one camera frame are generated from the plurality of image frames.

19. The method of claim 18, further comprising:
 buffering at least a portion of the image frames in the second resolution in a buffer.

20. The method of claim 17, further comprising:
 providing a user interface for receiving both the video recording command and the camera shooting command.

21. The method of claim 17, wherein the video recording operation and the camera shooting operation are performed via separate data paths concurrently in parallel.

* * * * *